US010607499B2

(12) United States Patent
Chen et al.

(10) Patent No.: US 10,607,499 B2
(45) Date of Patent: Mar. 31, 2020

(54) SIMULATION DEVICE FOR A FLIGHT MANAGEMENT SYSTEM (71) Applicant: AIR CHINA LIMITED, Beijing (CN)

(72) Inventors: Qi Chen, Beijing (CN); Shizhen Jiang, Beijing (CN); Ziguang Yan, Beijing (CN); Hongbin Shen, Beijing (CN)

(73) Assignee: Air China Limited, Beijing (CN)

(*) Notice: Subject to any disclaimer, the term of this patent is extended or adjusted under 35 U.S.C. 154(b) by 334 days.

(21) Appl. No.: 14/879,866

(22) Filed: Oct. 9, 2015

(65) Prior Publication Data
US 2016/0247412 A1 Aug. 25, 2016

(30) Foreign Application Priority Data

Oct. 11, 2014 (CN) .......................... 2014 1 05328845

(51) Int. Cl.
G09B 9/08 (2006.01)
G09B 9/30 (2006.01)
G08G 5/00 (2006.01)

(52) U.S. Cl.
CPC .............. G09B 9/08 (2013.01); G09B 9/301 (2013.01); G08G 5/0034 (2013.01)

(58) Field of Classification Search
CPC ........ G09B 9/08; G09B 9/301; G09B 5/0034; G09B 9/00; G09B 9/02; G09B 9/0408; G09B 5/00; G08G 5/00
See application file for complete search history.

(56) References Cited

U.S. PATENT DOCUMENTS 6,109,920 A 8/2000 Shih et al.
7,493,196 B2 * 2/2009 Caillaud ................. G01C 23/00
244/1 R
2002/0072414 A1 6/2002 Stylinski et al.
2003/0004619 A1 * 1/2003 Carriker ................. G01C 23/00
701/3
2006/0142904 A1 6/2006 Caillaud et al.
(Continued)

FOREIGN PATENT DOCUMENTS

CN 101881969 A 11/2010
CN 102867073 A 1/2013
(Continued)

OTHER PUBLICATIONS

First Office Action for the counterpart Taiwan Application No. 104133431, issued by the Intellectual Property Office dated Apr. 22, 2019, Taiwan.
EPO machine translation of CN 202838724 U.
Summons to attend oral proceedings issued by EPO for the counterpart European application No. 15189238.7, mailed Oct. 12, 2017.
Randy Walter: "Flight Management Systems" In: "Digital Avionics Handbook, Third Edition," Sep. 3, 2014 (Sep. 3, 2014), CRC Press, XP055390457.
(Continued)

Primary Examiner — Timothy A Musselman
(74) Attorney, Agent, or Firm — Oppedahl Patent Law Firm LLC (57) ABSTRACT The present application relates to a simulation device of flight management system (FMS), comprising a navigable database and a performance database; a display portion; a horizontal section portion and a vertical section portion, wherein the horizontal section portion and vertical section portion provide horizontal route information and vertical route information of the route designated by a user through the navigable database and performance database; and wherein the display portion is mutually integrated with the horizontal section portion and vertical section portion.

19 Claims, 10 Drawing Sheets

(56) References Cited

U.S. PATENT DOCUMENTS

| | | | |
|---|---|---|---|
| 2007/0264617 A1 | 11/2007 | Richardson et al. | |
| 2008/0064013 A1* | 3/2008 | Quimper | G09B 9/30 |
| | | | 434/38 |
| 2012/0296496 A1* | 11/2012 | Hedrick | G08G 5/0021 |
| | | | 701/3 |
| 2013/0030612 A1 | 1/2013 | Constans et al. | |
| 2013/0040269 A1 | 2/2013 | Kirkman | |
| 2014/0172204 A1* | 6/2014 | Coulmeau | G01C 23/005 |
| | | | 701/14 |

FOREIGN PATENT DOCUMENTS

| | | |
|---|---|---|
| CN | 202838724 U | 3/2013 |
| EP | 1359558 A2 | 11/2003 |
| JP | 2005532575 A | 10/2005 |
| JP | 2012240675 A | 12/2012 |

OTHER PUBLICATIONS

Vangie Beal: "Differences Between Thick and Thin Clients," Webopedia, Jul. 6, 2006 (Jul. 6, 2006), XP055304225.

Search Report for the counterpart Chinese Application No. 201410532884.5, issued by the State Intellectual Property Office dated Jun. 12, 2018, China.

First Office Action for the counterpart Chinese Application No. 201410532884.5, issued by the State Intellectual Property Office dated Jun. 25, 2018, China.

Jiangyun Wang and Xiaoyang Yang, Modeling and Simulation of Flight Management System, No. 2, vol. 26 of Flight Dynamics, issued in Apr. 2008, China.

Notice of Reasons for Refusal for the counterpart Japanese Application No. 2015-202365, issued by Japan Patent Office dated Jul. 31, 2019, Japan.

* cited by examiner

SIMULATION DEVICE FOR A FLIGHT MANAGEMENT SYSTEM

TECHNICAL FIELD OF THE INVENTION

The present invention relates to the field of aerotechnics. Specifically, it involves a simulation device of flight management system.

BACKGROUND

As the core of a digital electronic system of large aircraft, flight management system (FMS) is able to organize, coordinate and integrate a plurality of airborne electromechanical systems. Typically, an airplane can perform an automatic navigation under the control of FMS and complete the flight course, from take-off to landing, with the best route and the most suitable flight profile and in a fuel-efficient way. Such being the case, pilots generally spend over one third of their training in mastering the use of FMS.

Due to much hands-on experience involved, FMS can only be applied probably based on a great deal of practice rather than class learning and manual reading; meanwhile, the expensive flight training device (FTD) and full flight simulator (FFS) limit their easy access to pilot training for flight systems. Accordingly, a less expensive and easy-to-use training aid in a flight training system is greatly required.

Aerosim Inc. develops a desk VSIM (Virtual Simulator), i.e. PC-Primus Epic™ system. VSIM adopts a real Primus Epic® FMS system developed by Honeywell and designs compatible display software. However, the more accurate result produced by real FMS increases a burden to computer in calculation and is not good for a wider application for such a train aid to devices with limited computing resources; also, it adds costs to the training.

SUMMARY

In response to the technical problem above, the present application provides a simulation device of FMS, comprising a navigable database and a performance database; a display portion; a horizontal section portion and a vertical section portion, wherein the horizontal section portion and vertical section portion provide horizontal route information and vertical route information of the route designated by a user through the navigable database and performance database; and wherein the display portion is mutually integrated with the horizontal section portion and vertical section portion.

The simulation device of FMS as described above, wherein the display portion comprises an interface of control display unit (CDU).

The simulation device of FMS as described above, wherein the display portion comprises one or more display pages, a page database comprising one or more data items with each display page number having a corresponding data item, and a transferring instrument for transferring one or more data items in the page database to the one or more corresponding display pages.

The simulation device of FMS as described above, each page comprises a plurality of variable areas for displaying contents, and the corresponding data items in the page database comprise a plurality of contents, wherein at least one variable area can be updated according to the contents of the corresponding data item in the page database.

The simulation device of FMS as described above, the transferring instrument comprises at least one sub-transferring instrument which performs real-time computing and updates at least one variable area.

The simulation device of FMS as described above, the horizontal section portion comprises a leglistVertical for computing a vertical section, wherein each route comprises horizontal waypoint information of one or more waypoints.

The simulation device of FMS as described above, the horizontal section portion further comprises a leglistTemp for storing modifications, a leglistFinal for storing executed routes and a leglistFull for storing waypoints throughout the flight.

The simulation device of FMS as described above, the vertical section portion comprises take-off sub-portion, climbing sub-portion, cruising sub-portion, declining sub-portion, landing sub-portion and going around sub-portion, wherein each sub-portion comprises one or more predetermined points and the vertical section portion computes vertical section information of each the predetermined point.

The simulation device of FMS as described above, one predetermined point is set by every other one second for the take-off and approaching portions.

The simulation device of FMS as described above, the vertical section portion computes the vertical section information of the predetermined points, by iteration, of take-off sub-portion, climbing sub-portion, cruising sub-portion, declining sub-portion, landing sub-portion and going around sub-portion.

The simulation device of FMS as described above, the vertical section portion simplifies, by table looking up, the iteration calculation of predetermined points of climbing sub-portion, cruising sub-portion, and declining sub-portion.

The simulation device of FMS as described above, the vertical section portion computes, by interpolation, the vertical section information of predetermined points of take-off and approaching sub-portions.

The simulation device of FMS as described above, the vertical section portion comprises an arrival-departure database.

The simulation device of FMS as described above, the arrival-departure database comprises a plurality of data tables classified by arrival-departure conditions.

The simulation device of FMS as described above, the arrival-departure database comprises a plurality of sub-data tables classified by initial performance parameters of an airplane.

The simulation device of FMS as described above, the sub-data tables comprise a plurality of vertical section data with each vertical section data corresponding to the specific values of initial performance parameters of one or more airplanes.

The simulation device of FMS as described above, the specific values of initial performance parameters of one or more airplanes comprise a maximum value and a minimum value.

The simulation device of FMS as described above, wherein the vertical section portion upgrades horizontal route information of the horizontal section portion according to vertical route information.

The simulation device of FMS as described above, wherein the vertical section portion uses the vertical sections that have at least partially been computed when waypoints change.

Based on the other aspect of the present invention, it provides a training aid comprising the simulation device of FMS as described above.

BRIEF DESCRIPTION OF THE DRAWINGS

Hereinafter, some preferred embodiments of the invention will be described in reference to the accompanying drawings.

DETAILED DESCRIPTION OF THE INVENTION

To have the objects, technical solutions and advantages of Examples more clearly, the technical solutions of the Examples are defined explicitly and completely below based on the Figures in the Examples of the present invention. Apparently, the Examples described are only a part of, not exhaustive, examples of the present invention. On the basis of Examples, all examples obtained by a person skilled in the art without involving creative work fall under the protection scope of the present invention.

For one thing, the present invention achieves a simulation of a flight manager structurally and functionally by providing a simulator of FMS. The FMS simulator of the present invention retains most of navigation computing and performance computing functions as well as input and output functions associated with CDU, and removes the functions having little or no connection with on-ground pilot training. The FMS stimulator can be either a hardware device or software operated in a personal computer, laptop, tablet PC (such as an ipad), mobile phone, or other computing device.

For another, the present invention provides a FMS and CDU training aid. A pilot can use FUM and CDU for practice on ground or any other sites through the training aid of the present invention and thus greatly reducing the training costs.

Figure 1:
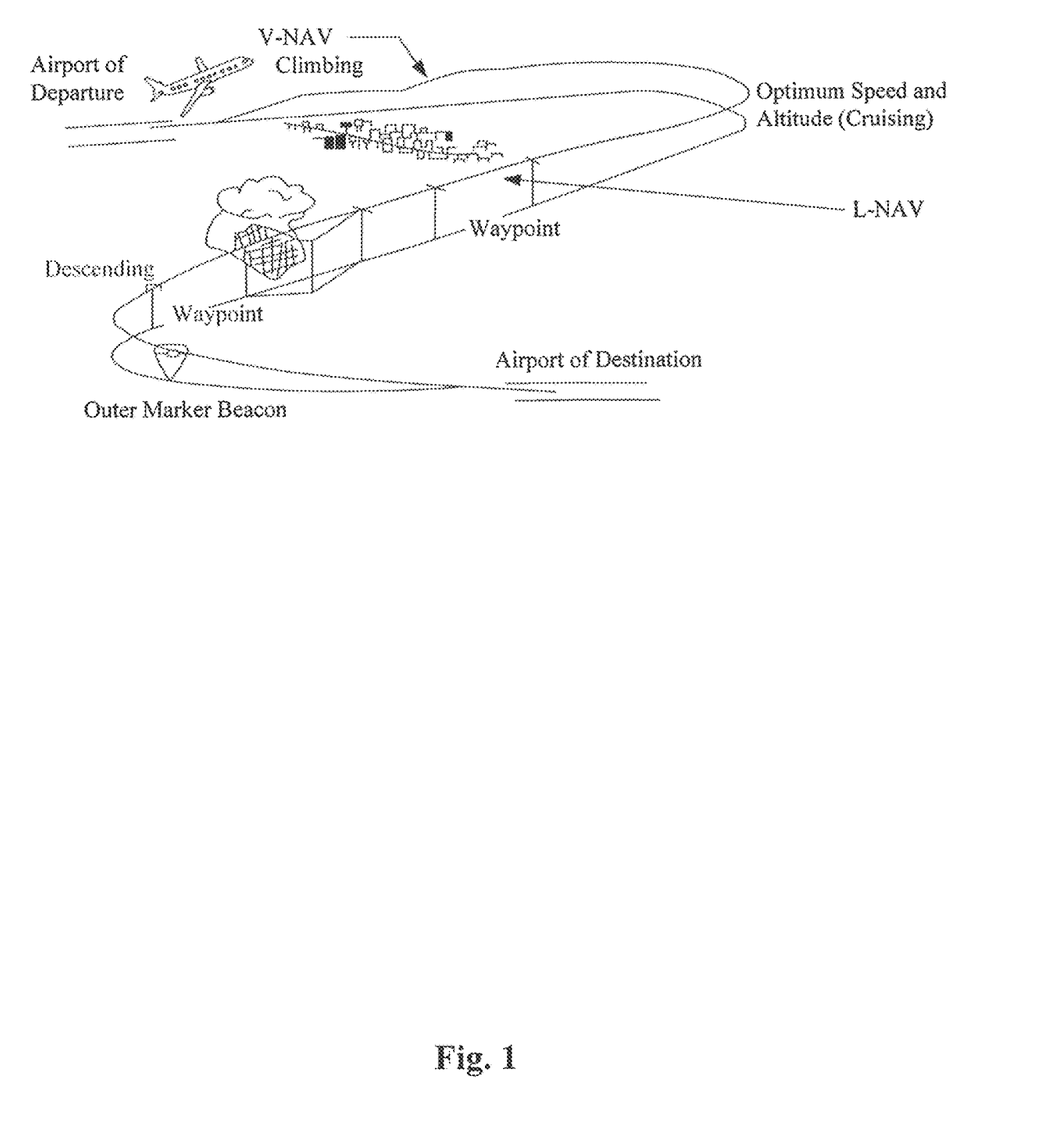
FIG. 1 is a schematic diagram showing a complete flight course an airplane.

FIG. 1 is a schematic diagram showing a complete flight course an airplane. As illustrated in FIG. 1, one flight course of an airplane comprises a take-off, climbing, cruising, declining, approaching, and declining. Limited by altitude restriction or speed restriction, the climbing of an airplane can be divided into many stages; also, the airplane undergoes a plurality of waypoints in cruising with optimum speed and optimum altitude and experiences declining, approaching and landing successively after declining point. As such, the airplane forms a vertical section and a horizontal section in a flight course, while FMS can improve the flight efficiency by providing predictions for flight time, distance, speed, economic section and altitude and free a pilot from routine operations, ensuring a safe and economical flight. A simulator of an example of the present invention can also achieve the above prediction.

Whether the real FMS and CDU or the prior training devices, FMS and CDU adopt a server-user mode. That means that CDU is connected as an individual display device or interface with FMS by data chains. However, such a connection complicates the system and disrupts the system operation due to transmission failure. For simplification, FMS simulators (including simulation devices and simulation methods) in Examples of the present invention incorporate FMS and CDU functions into a functional entity or an application by integration, which is beneficial to both data exchange and stimulator performance development.

Figure 2:
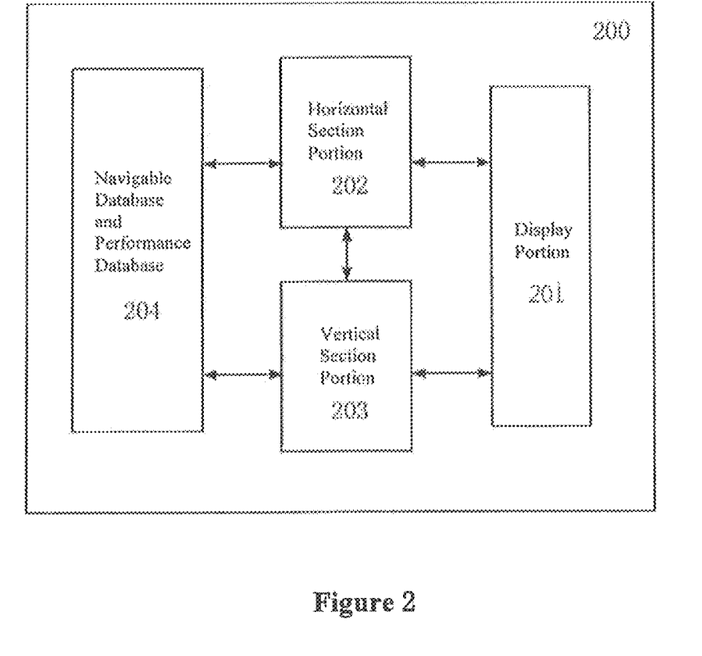
FIG. 2 is a schematic diagram showing a stimulation device of FMS in an example based on the present invention.
Figure 3:
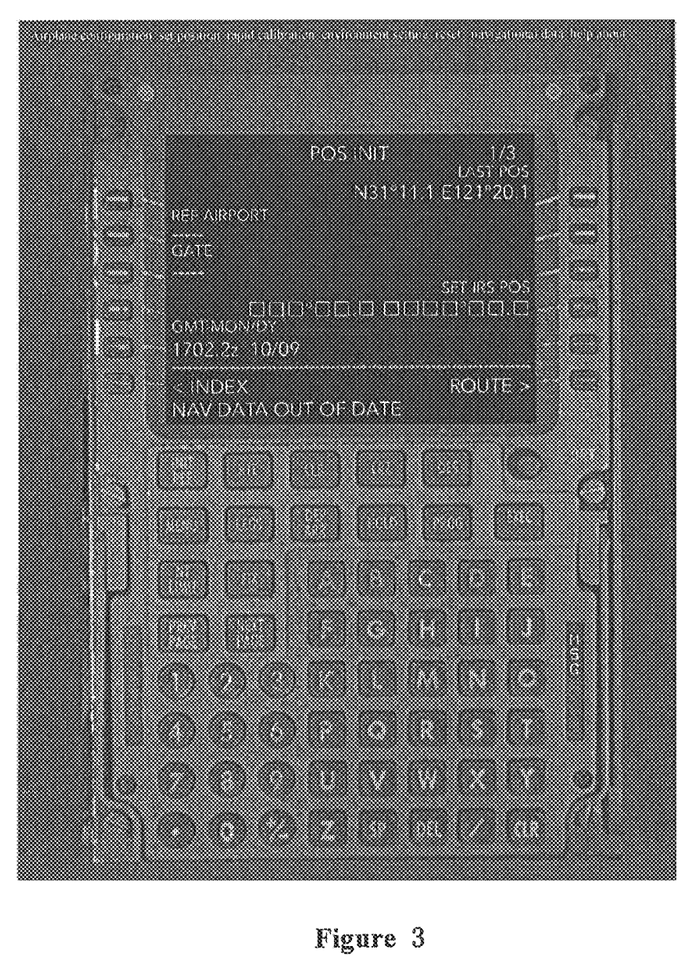
FIG. 3 is a schematic diagram of CDU interface.

FIG. 2 is a schematic diagram showing a stimulation device of FMS in an example based on the present invention. The simulation device 200 of FMS, as illustrated in FIG. 2, comprises a display portion 201, a horizontal section portion 202 and a vertical section portion 203. The display portion 201 comprises a CDU interface 300 as shown in FIG. 3 with the same display screen and keypad as those of the real CDU for a better simulation effect. Specifically, the CDU interface 300 can be either a hardware device comprising a display screen and keys or a software interface comprising a display portion and virtual key portion. In accordance with an example of the present invention, CDU interface 300 is an interface as shown by tablet PC such as ipad. An user is able to activate the functions corresponding to the virtual keys shown in the panel by touching the virtual keys of the tablet PC. That is, CDU interface 300 represents an interface between an user and the simulator of the present invention. For example, CDU interface 300 comprises a display area, a line select key, a functional mode key, alphanumeric keys, an illuminous annunciator, etc.

According to an example of the present invention, the simulation device 200 of FMS may further comprise a key portion to facilitate an user to set the simulation device of FMS. The key portion can be either real keys or the virtual keys of the display portion 201.

The horizontal section portion 202 provides horizontal route information. Specifically, the horizontal section portion 202 is used to obtain, store and provide information about waypoints that an airplane passed or to be passed by an airplane based on predication and information such as speed, altitude, time, course, and distance associated with the waypoint in a flight. All this waypoint information define the horizontal section for a flying airplane.

The vertical section portion 203 provides vertical section information in a flight. Specifically, according to different flight stages of an airplane, the determination of flight information at predetermined points include, but not limited to, predicted speed, predicted altitude, predicted time and predicted residual fuel. The selection of predetermined points vary with flight stages of the airplane; for instance, one predetermined point is set in every 1,000 feet or less during climbing and one predetermined point is set in every 5 sea miles or less during cruising. According to an example of the present invention, for simplifying computation, one predetermined point is set in every second during take-off and approaching stages, the two involve most of computation workloads, which can substantially reduce the computation. All this information of predetermined points define the vertical section of a flying airplane.

According to an example of the present invention, the simulation device of FMS comprises a navigation database and a performance database 204. The navigation database is designed for providing automatic navigation from take-off to landing, which stores navigation information of the entire region, comprising the airport and viewpoint of a flight area, location of navigation station, frequency and route structure.

Particularly, the data of navigation database can be divided into two types: the standard data are applicable to all airline companies and provided regularly by Jeppeson Aviation through a contract. The other data are only linked with the route structure of a flight route of an airline company, which can be provided by the airline company using the simulator of the present invention. In particular, data of the navigation database comprise navigation device information (including the marker, location, frequency and elevation of the navigation station), airplane information (including location and elevation of an airplane, length and direction of a runway), route information (including type, altitude, course, leg distance, and waypoint instruction), company route (e.g. data for the regular route of a specific airline company), and terminal area procedures (including standard departure SID, standard arrival STAR, procedure turn, waiting, going around, and approaching).

The performance database serves as the foundation of flight performance management for computing performance optimization and comprises the data necessary to compute the vertical section of an airplane. The performance database can be divided into two types: one is detailed aerodynamic model, the other is engine data model. For example, the aerodynamic model comprises wing area, flight envelope, lift efficiency curve, and flight polar curve, while the engine data model comprises fuel consumption performance curve, thrust data of every flight stage and noise data of the engine.

After obtaining the horizontal and vertical sections of an airplane in flight, the horizontal section portion 202 and vertical section portion 203 provide the horizontal and vertical section information for the display portion 201 to show them correspondingly at CDU interface 300.

Figure 4:
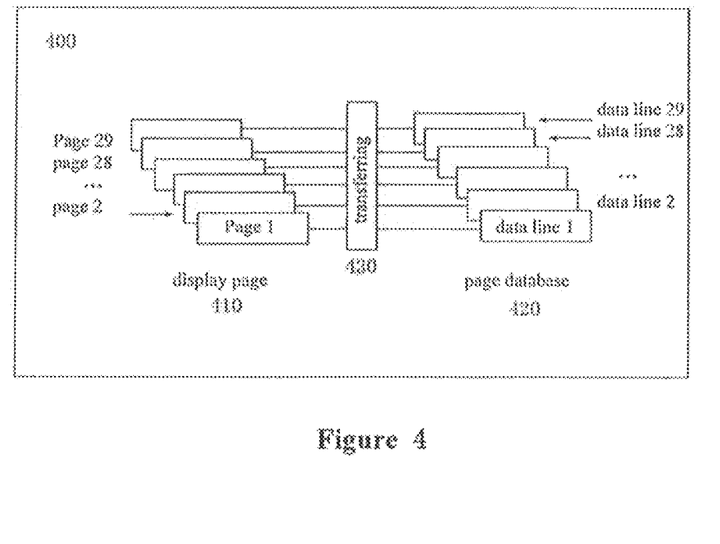
FIG. 4 is a schematic diagram showing a display portion of a stimulation device of FMS in an example based on the present invention.

FIG. 4 is a schematic diagram showing a display portion of a stimulation device of FMS in an example based on the present invention. As shown in FIG. 4, the display portion 400 comprises page 410, page database 420 and transferring instrument 430. According to an example of the present invention, the display page 410 consists of 29 pages, including an initial/basic index page, identification page, initial position page, basic position page, drifting position page, route page, departure/arrival index page, departure page, arrival page, initial performance page, performance limit page, N1 limit page (ground), taking-off basic page (2 pages), climbing page (ECON), route and leg page, N1 limit page (in the air), single climbing page, cruising page (ECON), route data (RTE DATA) page, process page (4 pages), waiting page, single cruising page, declining page (ECON), basic approaching page, and declining prediction page. Correspondingly, the page database 410 comprises a corresponding data line based on each page, while the transferring instrument 430 is used to transfer the data in page database 410 and thereby to show the data in a data line of the page database 410 in the corresponding page.

According to an example of the present invention, the display interface consists of 38 variable areas. Specifically, each display interface consists of a title bar, a draft bar and 6 lines, wherein each line consists of a title and 2 sub-lines of the main body, while each sub-line consists of left, middle and right variable areas. For example, the display interface displays in text and the variable areas are shown in textbox.

In the above example, the display portion of the simulation device of FMS in the present invention displays the CDU interface 300 by calling the database, which, as a great benefit, allows the page database 420 to prestore the content to be displayed. Among others, the simulation device of FMS of the present invention can compute requisite contents in advance and store them in the page database 420 prior to an user opening the pages comprising such contents involving computation. That will measurably save computing resource while accelerate the display.

The upgrading of the display page can also be performed smoothly. For example, the contents in a textbox-like variable area are able to be changed by modifying PAGE data. In particular, when the contents of a variable area in a present display page vary with other parameters, the transferring instrument comprises a sub-instrument directed to partial variable areas, specifically to the contents in a variable area required to be displayed. Once calling the page, the sub-instrument computes in real time the contents supposed to be displayed in the textbox. In other words, the transferring instrument, in respect of the variable area in real-time change, comprises the sub-instrument directed to the variable area. For instance, the instrument is able to compute in real time the content displayed in the variable area based on a vertical section.

Figure 5:
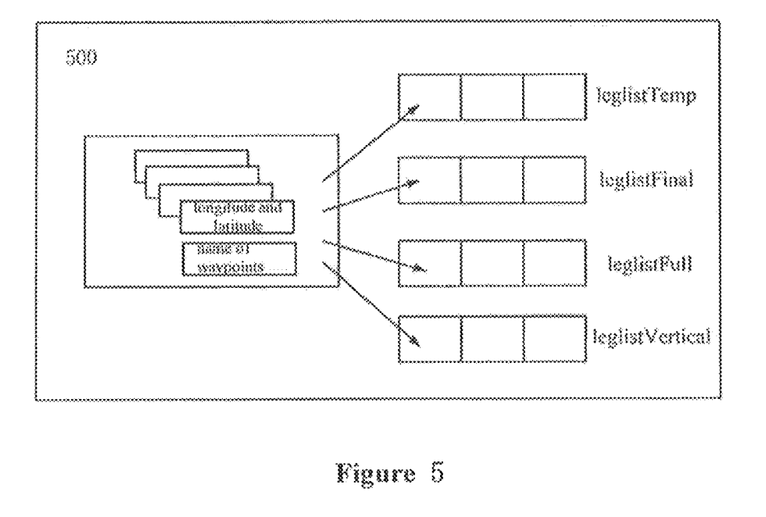
FIG. 5 is a schematic diagram showing a horizontal section portion in an example based on the present invention.

FIG. 5 is a schematic diagram showing a horizontal section portion in an example based on the present invention. As shown in FIG. 5, the horizontal section portion comprises 4 leglists. The leglist can be represented either in data structure such as an array and chain table or a storage cell or register. The 4 leglist are respectively a leglistTemp for storing modification, a leglistFinal for storing executed routes, a leglistFull for storing waypoints throughout the flight, and a leglistVerical for computing a vertical section. The horizontal waypoint information, data elements stored in each waypoint, comprises 11 information: waypoint name, longitude and latitude of waypoint, altitude and speed limits of waypoint, anticipated speed, altitude and time for reaching the waypoint, course to waypoint, distance between the previous and present waypoints, wind data of waypoint, and route name of waypoint.

The leglistTemp is mainly used to support backward function. For example, new waypoint information is temporarily stored in leglistTemp as the new waypoint information input by an user is not confirmed. According to an example of the present invention, when a sufficient compute capability is available, the system computes the horizontal and vertical section information with or without waypoint.

LeglistFinal is applied to store effective waypoint information, i.e. to store the waypoint information that has been confirmed to execute. According to an example of the present invention, the system directly computes the horizontal and vertical section information with or without waypoint in an effective route. During the air, the points passed by the airplane are deleted automatically from the effective route displayed.

The leglistFull is useful in storing the collection of the passed route comprising waypoints and the one to be passed, that is, the entire route. Since leglistFull stores entire route information comprising take-off, climbing, cruising, declining and approaching, an user can switch to any of the above stages.

The leglistVertical is employed to store the route for computing the vertical section. Although some waypoints do not require a computed vertical section, e.g. the waiting point, some waypoints have to be added to the computation for the vertical section, e.g. during the air, the points passed by the airplane are deleted automatically from the effective route displayed. However, such points are essential to the computation of the vertical section and thus have to be involved. Meanwhile, a leglistVertical is different from a leglistFull.

The structure of the horizontal section, as described above, facilities operations for an user and reduces demands for frequent data loading and real-time computation, remarkably increasing operating efficiency and reaction speed of the simulator of the present invention.

According to an example of the present invention, the horizontal portion is built by leglists. Such leglists store horizontal waypoint information comprising 11 information: waypoint name, longitude and latitude of waypoint, altitude and speed limits of waypoint, anticipated speed, altitude and time for reaching the waypoint, course to waypoint, distance between the previous and present waypoints, wind data of waypoint, and route name of waypoint. The leglists consist of leglistTemp, leglistFinal, leglistFull, and leglistVertical.

According to an example of the present invention, the horizontal section portion 202 directly exchange data with the display portion 201. For example, the waypoints in leglistFinal will be stored into the display PAGE database, or the transferring instrument is used to display the RTE LEG page of CDU to look at all effective routes. Some of the 11 information of each waypoint is accessible by the navigation database (such as a waypoint name and a route name) while other horizontal section information can only be obtained by computation.

The taking-off waypoint is used as an example below to illustrate a waypoint computation. In a way to simplify the computation, the conditions are set as follows: airport A, zero meter for altitude, runway S, 0° north, departure phase, airplane weight M, center-of-gravity position G, take-off flap θ, calm, standard temperature ISA and airplane cost index C. 410 feet of departure altitude for taking off from the first waypoint without considering cruising altitude. Specifically, the computation involves the following steps:
  a. computing the longitude and latitude at 410 feet;
  b. computing the take-off section according to the performance database;
  c. computing speed, horizontal distance, fuel consumption, and time for arrival;
  d. recomputing the distance;
  e. recomputing the longitude and latitude;
  f. repeating steps b-e until the error between two iterations less than the predetermined value; and
  g. computing the speed, horizontal distance, fuel consumption and time of arrival of next waypoint after obtaining the waypoint information about the 410 feet of departure altitude.

Figure 6:
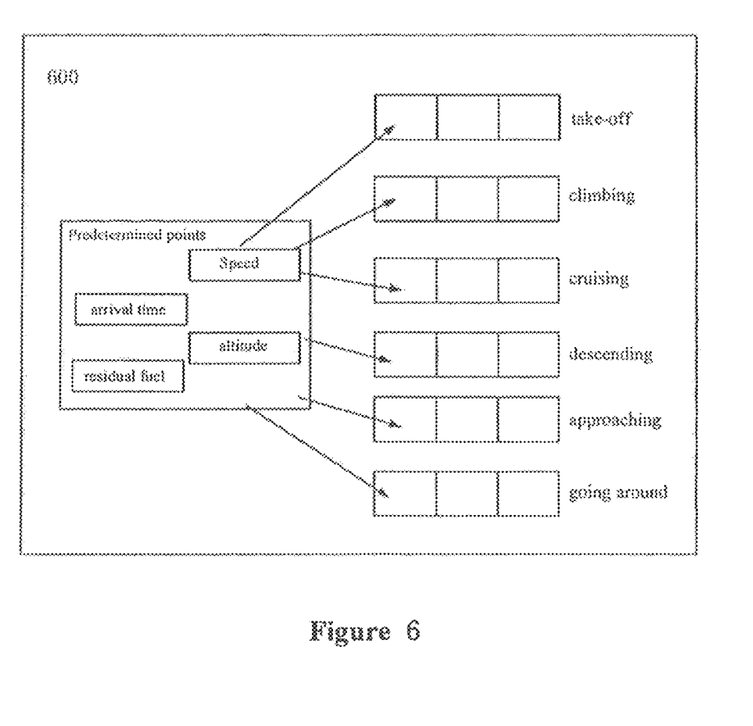
FIG. 6 is a schematic diagram showing a vertical section portion in an example based on the present invention.

FIG. 6 is a schematic diagram showing a vertical section portion in an example based on the present invention. The vertical section portion 600, as illustrated in FIG. 6, comprises take-off sub-portion 601, climbing sub-portion 602, cruising sub-portion 603, declining sub-portion 604, landing sub-portion 605 and going around sub-portion 606, wherein each sub-portion comprises one or more predetermined points. As indicated before, the selection method is variable around the predetermined points of sub-portions. The predetermined points comprise horizontal waypoints.

According to an example of the present invention, the vertical section portion 600 computes the predicated speed, altitude, time, and residual fuel of each predetermined point and store the results in the corresponding sub-portions to obtain the vertical section of each sub-portion.

Figure 7:
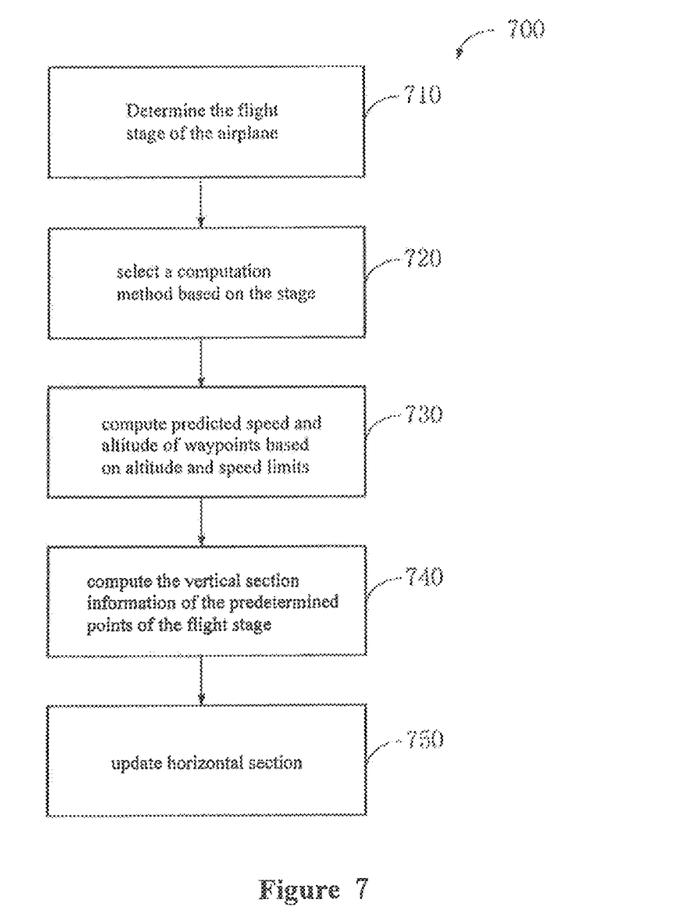
FIG. 7 is a flow chart showing a method for computing a vertical section in an example based on the present invention.

FIG. 7 is a flow chart showing a method for computing a vertical section in an example based on the present invention. Based on FIG. 7, the method 700 for computing the vertical section comprises the following contents: in step 710, determining the stage of an airplane from take-off, climbing, cruising, declining, landing and going around. Since each stage has a different computing method, a corresponding computing method in step 720 can be selected based on the current flight stage. Also, step 720 may be performed after other steps while before the specific computation.

In the next step 730, the limits for speed and altitude involved in all waypoints throughout a flight are analyzed and, based on which, compute predicted speed and altitude necessary to fly to these waypoints. In step 740, proceed to compute the vertical information of all the predetermined points passed by the airplane in a flight on the basis of every waypoint in the flight as well as the setting and specific computation method of the predetermined points, which includes but not limited to predicted speed, predicted altitude, predicted time and predicted residual fuel.

According to an example of the present invention, ground motion acceleration, liftoff, undercarriage retraction and flap retraction are all performed during the take-off stage. Typically, intensive predetermined points are arranged to reflect the aerodynamic characteristics of an airplane as take-off section computation is affected by the frequently changed aerodynamic configuration. According to an example of the present invention, the predetermined point is arranged by every other 10 or less feet. According to another example of the present invention, the predetermined point is arranged by every other one second to reduce the computation. According to an example of the present invention, the approaching stage adopts the same predetermined point arrangement as the take-off stage. According to an example of the present invention, the predetermined point arrangements for take-off and approaching stages can refer to navigation database. Meanwhile, the example of 410 feet as described above is also applicable to take-off stage and other predetermined points computation. In the approaching stage, the vertical section information can be obtained, by a method similar with that of take-off, on the basis of a landing point.

Similar with the climbing and descending stages, the predetermined points arrangement uses altitude step. According to an example of the present invention, the climbing stage starts from 1,500 feet high and ends at limited altitude or cruising altitude. The descending stage starts from the cruising altitude to the approaching altitude (such as the limited altitude of an outer marker beacon). In the climbing and descending stages, the predetermined point is arranged by every other 1,000 or less feet.

In the cruising stage, the airplane has a smooth flight. According to an example of the present invention, the predetermined point is arranged by step length of 5 or less sea miles. The several climbing and level flight or cruising stages an airplane may undergo in a flight respectively require a computation to obtain the vertical section information of predetermined points, which, in turn, make the vertical section of the entire flight available.

The climbing stage is used as an example below to illustrate how the vertical section information of predetermined points is obtained in the present invention.

Suppose that the climbing point is 1,500 feet and the target altitude is the cruising altitude or the next altitude limited point. Numerical integration method is used to calculate the speed, oil consumption, lift force, resistance and other parameters required by an airplane to reach the target altitude.

Integration step is set as 1,000 feet based on a climbing stage. First, relevant parameters for intermedial height 2,000 feet (1500+1000/2) are calculated, wherein the intermedial height is the mean value of the range from 1,500 feet to 2,500 feet, which then is used to obtain the data of 2,500 feet. The calculation involves the following steps:

- a. suppose that the weight (W) equals the lift force (L) at 2,000 feet high, which makes lift coefficient (CL) available;
- b. calculate a modified resistance coefficient based on CL and then calculate thrust and acceleration factor at this altitude;
- c. calculate the angle $\gamma$ of climb track based on the thrust and acceleration factor at this altitude;
- d. calculate rate of climb (R/C) based on $\gamma$ and then calculate the step time necessary to climb 1,000 feet based on R/C;
- e. calculate distance and oil consumption based on step time to modify the W at 2,000 feet high, and then modify L based on $\gamma$;
- f. recalculate CL according to the modified W and L; and
- g. repeat steps b-f until the difference of W iterated twice less than the predetermined threshold value.

Specifically, each circle produces one W that is closer to the previous one. When the difference of Ws is less than the permissible error (i.e. the predetermined threshold value), the W is accepted as the final W. As a result, data associated with the vertical section information of 2,000 feet are available and then data about 2,500 feet can also be obtained by the same method. Similar method can be used to calculate other altitude data until the target altitude data are obtained.

An airplane must change into a level flight when it reaches the altitude limit specified during a climbing stage. After passing the waypoint, the airplane can continue its climbing. Similar methods can be used to deal with waypoints having a speed limit.

As iterative computations consume a great deal of time for devices without enough resources, such a calculation inevitably brings about undesirable user experience in a flight. According to one example of the present invention, data tables are introduced based on the categories of climb track angle $\gamma$ in an effort to reduce demands for computation resources. Specifically, angle $\gamma$ ranges from 200 to 5° and one data table is provided by every other 0.10. The data table records information comprising different weights and cost indices under the climb track angle, and speeds, altitude, horizontal distance and time of the flight based on temperatures. Suppose that the track angle $\gamma$ of the climbing with constant speed presents a linear reduction as altitude increases, vertical section data such as flight speed, altitude, horizontal distance, time and remaining oil can be obtained directly by looking at the table. That will avoid resource occupancy by iteration.

In step 750, more accurate vertical section information, e.g. speed, altitude, time and residual fuel, can be obtained according to vertical section. Update the horizontal section information of waypoints in a horizontal section and re-compute the horizontal section information of the remaining waypoints.

A complete vertical section of a flight is available following all vertical section computations of each flight stage. The crosslink between a vertical section and a horizontal section lies in distance that in turn provides access to information such as speed and altitude required to reach next waypoint. According to one example of the present invention, the obtained speed and altitude as described above can be used to obtain data such as radius of turning circle necessary to reach next waypoint. That means a modification to the distance to the present waypoint and the distance to the next waypoint. In this connection, the horizontal section is updated again.

According to one example of the present invention, in the case that a waypoint is changed in a flight, the earlier computations should be used as much as possible to save computation resources.

For example, if the waypoints are changed while the take-off weight, cost indices, cruising altitude and backup oil remain the same, the first step is to determine the stage where the change occurs. In the case that the change occurs in a cruising stage but the voyage stays the same, the vertical sections of waypoints of climbing, descending and cruising that have not changed remain the same and thus can be used directly. The next step is to compute the vertical section data of the changed waypoints. In the case that the change occurs in a descending stage, the vertical section of climbing stays the unchanged and can be used directly. That means the vertical sections of descending and cruising needs computing again. In the case that the change occurs in a climbing stage and the speed and altitude limits do not affect the waypoints that have not changed, the vertical section of the waypoints of the climbing that has not changed remains the same and thus can be used directly. That leads to a re-computation of the vertical sections of changed leg, cruising and descending stages. Clearly, by using existent data the possibilities of re-computations for vertical sections involved in the entire route are minimized, which results in a great decrease in computation time.

According to one example of the present invention, the optimization of a route can be performed according to initial parameters such as take-off weight, cost indices, cruising altitude, backup oil, waypoints, altitude and speed limits and voyage. For instance, the newly computed vertical section of the present route is stored in the route database to facilitate further computation of vertical sections.

Figure 8:
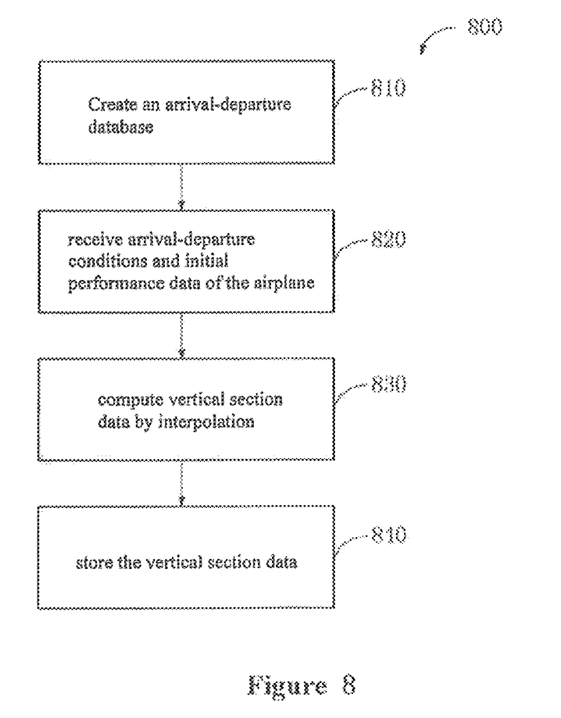
FIG. 8 is a flow chart showing an optimization method for computing a vertical section in an example based on the present invention.

FIG. 8 is a flow chart showing an optimization method for computing a vertical section in an example based on the present invention. The method relates to procedures for arrivals and departures, i.e. the take-off and approaching stages, and involves most computation in terms of vertical sections. An optimized computation in this part may solve the limited computation resource to a large extent.

The optimization method 800 comprises creating an arrival-departure database in step 810. The database is used for storing vertical section data computed through given arrival-departure sites and given initial performance data. Such a setting provides a direct access to the vertical section data stored in the database if the user inputs the same arrival-departure and initial data next time, reducing a sizable amount of computation.

However, the defect of the method is that it involves numerous initial performance data and even thousands of arrival-departure conditions. Since there are more than tens of thousands of data when the two are combined, it is impossible to store all this information concerning vertical sections into the database, which would waste storage space and make it hard to create and upgrade the database.

Figure 9:
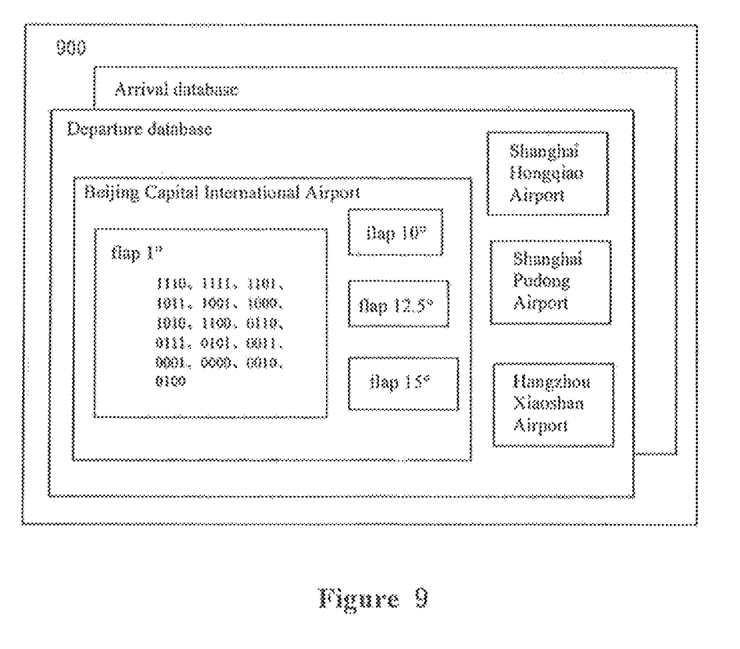
FIG. 9 is a schematic diagram showing a structure of arrival-departure database in an example based on the present invention.

FIG. 9 is a schematic diagram showing a structure of arrival-departure database in an example based on the present invention. As illustrated in FIG. 9, the arrival-departure database comprises a departure database and an arrival database. Take the departure database as an example, an independent data table is created according to each airport or each runway of the airport. For instance, FIG. 9 shows four data tables: Beijing Capital International Airport, Shanghai Hongqiao Airport, Shanghai Pudong Airport and Hangzhou Xiaoshan Airport. A person skilled in the art could understand that there can be more data tables or the data tables can be present in more forms.

Further, the data table of each airport can be divided into a plurality of subtables on the basis of different takeoff flaps of an airplane. For example, FIG. 9 shows that the data table of Beijing Capital International Airport comprises four subtables of flaps 1, 5, 10 and 15. A person skilled in the art could understand that there can be more data subtables or the data tables can be present in more forms.

Further, each subtable records the vertical section data corresponding to the 4 initial performance parameters of an airplane. According to an example of the present invention, if the four parameters respectively have a selective range of A (0, 1), B (0, 1), C (0, 1) and D (0, 1) and the vertical section data corresponding to 16 groups of data are record in the data subtables, the 16 groups of data require the following formats: 1110, 1111, 1101, 1011, 1001, 1000, 1010, 1100, 0110, 0111, 0101, 0011, 0001, 0000, 0010 and 0100. For example, 1011 represents vertical section data of a flight when A is 1, B is 0 and C and D are 1. 0101 represents vertical section data of a flight when A is 0, B is 1, C is 0 and D is 1.

According to an example of the present invention, the initial performance data have 4 parameters: takeoff weight, center of gravity, cruising altitude and cost indices. Any change to one initial parameter results in correspondingly changed final vertical section data.

According to an example of the present invention, in order to minimize computation and avoid iterative operation, interpolation algorithm is used to directly obtain the vertical sections of an airplane in arrival and departure based on the vertical section data corresponding to the initial performance parameters of the airplane stored in the arrival-departure database. Since the initial performance parameters in the arrival-departure database have 4 variables, the vertical section data with any initial condition of the arrival-departure site can be interpolated with the prestored 16 groups of initial data.

According to an example of the present invention, a linear interpolation method is used to compute the vertical section data. Further, according to an example of the present invention, the split curve interpolation or other curve interpolation methods are used for takeoff weight and center of gravity. Meanwhile, the linear interpolation method is still used for cruising altitude and cost indices.

According to an example of the present invention, the data subtables of the arrival-departure database further record the vertical section data corresponding to the initial performance parameters of other airplanes outside the data value. During the calculus of interpolation, either the closest data points or a plurality of data points can be used for interpolation, e.g. conduct a lineal or curve interpolation on a plurality of points. Such being the case, the more the vertical section data the subtables record, the more accurate the results become.

In the optimization method 800, the receiver in step 820 uses the input arrival-departure conditions and the initial performance data of an airplane. Specifically, the user is able to input directly in CDU interface the take-off airport and runway, airport and runway of destination, and initial performance data, comprising zero fuel weight, backup oil, cost indices, cruising altitude, takeoff flap and center of gravity.

Some initial conditions of the approaching procedure cannot be input directly, e.g. the weight during the approaching. Data such as cruising altitude and cost indices affect the weight but they cannot be added to the initial parameters as such data would bring about 5 or more initial parameters. Also, the addition increases the initial data, expands the database and rises the difficulty to create a database, being negative to user experience. According to an example of the present invention, the cruising altitude and cost indices are used to analyze the role of the approaching in weight and then a fuzzy processing is carried out on the weight. For example, methods similar with "rounding" are employed to deal with the weight value while trying to make units digit become even number, meeting the input format of calculus of interpolation.

Further, the FMS simulator of the present invention comprises a communication module, which allows a connection to another server, computer or internet for communication by a wire or wireless means. When the arrival-departure condition input by an user cannot be found in the arrival-departure database, the FMS simulator connects to another server, computer or internet, which comprise the vertical section data corresponding to initial performance parameters of an airplane under the arrival-departure condition to download the vertical section data. According to another example of the present invention, the user may create the contents in the arrival-departure database and upload the vertical section data to the database.

According to an example of the present invention, a server is specifically provided for storing all vertical sections. Once an user goes online, the server synchronizes the arrival-departure database on the FMS simulator. The FMS simulator supports the user to download the necessary vertical section data of the arrival-departure sites from the server while being able to collect the vertical section of the sites particularly owned by the user. That means all users create and maintain the database, which remarkably improves user experiences.

In view of the above method to expand the arrival-departure database and function of the database to store historical vertical section data, the database enlarges with the use of users. All this ensures an user that the FMS simulator of the present invention becomes faster and more accurate with increasing uses, that is, the FMS simulator has a self-learning function.

In step 830, the corresponding vertical section data can be obtained directly by calculus of interpolation based on the vertical section data corresponding to the initial performance data of the airplane stored in the arrival-departure database. In step 840, the obtained vertical section data are stored in the take-off or approaching sub-portions of the vertical section portion of the FMS simulator.

Figure 10:
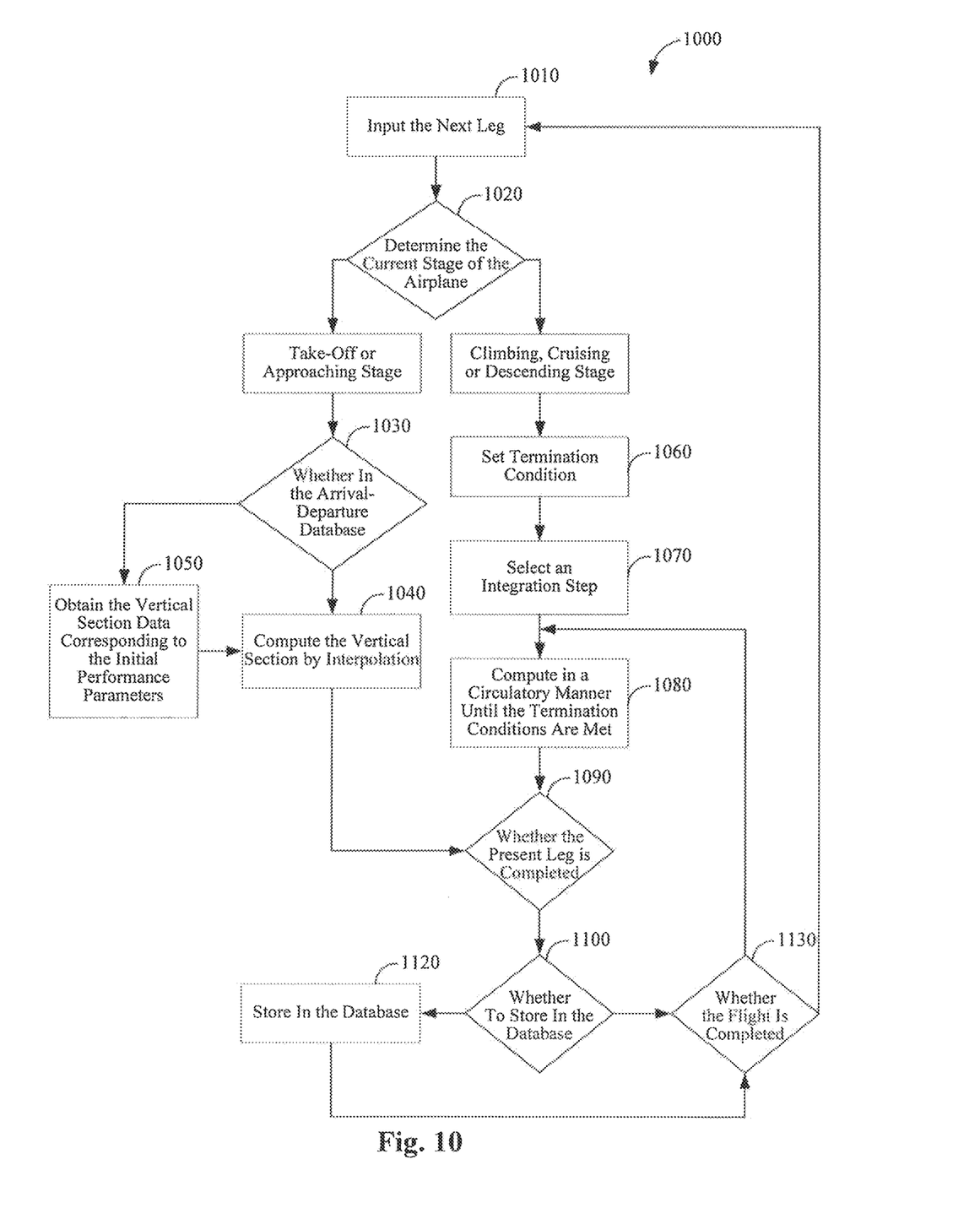
FIG. 10 is a flow chart showing a method for computing a vertical section in another example based on the present invention.

FIG. 10 is a flow chart showing a method for computing a vertical section in another example based on the present invention. As illustrated in FIG. 10, the method 100 for computing a vertical section comprises, in step 1010, receiving the leg information input by an user. If the user inputs an airport of departure and airport of destination, the vertical section is computed from the first leg after taking off and then computed in the following other legs.

In step 1020, the flight stage is determined. That is, if it is in a take-off, climbing, cruising, descending or approaching. In the case that the airplane is in a take-off or approaching stage, in step 1030, determine whether the arrival-departure conditions of an airplane are included in the arrival-departure database. In the case that the database includes the vertical section data with such arrival-departure conditions, in step 1040, the vertical section data of arrival-departure sites when the airplane takes off or approaches can be obtained directly through calculus of interpolation. In the case that the database does not include the vertical section data with such arrival-departure conditions, the vertical section data corresponding to the initial performance data of the airplane with such conditions can be obtained in step 1050. According to the above contents, the obtained data comprise vertical section data of 16 combinations corresponding to the value ranges of 4 initial performance data of the airplane. Following this, the vertical section data of take-off or approaching can be obtained in step 1040 by calculus of interpolation, rather than a time-consuming iterative computations, which greatly reduces computation requirements while accelerating computation and improving user experience. In addition, little difference is found in the result comparison between calculus of interpolation and iterative computations, showing the suitability of calculus of interpolation to training.

In the case that the airplane is in the climbing, cruising or descending stage, the vertical section data for all legs are available through integral circulation. Circulation termination conditions can be set in step 1060, comprising: (1) altitude limit, i.e. the predetermined limiting height; (2) cruising altitude, i.e. reaching the predetermined cruising height; (3) speed limit, i.e. reaching the predetermined speed; and (4) distance limit, i.e. completing the predetermined distance, e.g. reaching the predetermined waypoint. According to the example of the present invention, other circulation termination conditions can be set to facilitate the computation of the vertical section.

In step 1070, integration step is determined based on the flight stage of an airplane and/or the practical requirements for computing vertical section. As described above, 500 feet or 1,000 feet can be selected as the integration step in terms of climbing or descending stage. Regarding the cruising stage, the integration step is 5 or 10 sea miles.

In step 1080, a corresponding integral calculation is selected based on the current flight stage. Compute the vertical section of the airplane in a circulatory manner on the basis of the predetermined points determined by the integration step until the termination conditions are met.

In step 1090, determine whether the computation of the vertical section of the present leg is completed. The computation restarts if it is not over. If the computation is completed, in step 1100, determine whether the computation result of the vertical section is to be stored in the database. If the storage is necessary, the result will be stored in the database in step 1120. For example, the take-off and approaching vertical sections can be stored in the arrival-departure database. With respect to the vertical sections of other flight stages, the determination to store the vertical sections depends on the user's requirements or leg frequency, which makes future computations more convenient.

In step 1130, determine whether the present flight stage is completed. If it is, step 1010 restarts to compute a next leg. Otherwise, computation restarts to go through the uncompleted vertical section.

The example below is used to illustrate the technical effect of the optimization method of the present invention: operate the FMS simulator of the present invention at an iPad as a test tool. The specific contents are as follows: an airplane goes through a flight from Shanghai (ZSSS) to Hangzhou (ZSHC) with a runway 36R and departure NXD2D. It first flies to Jianqiao (CJ) followed by Dangshan (DSH), with approaching ILS15 and transition DSH. Performance data: 550,000 kg zero fuel weight, 2,000 kg backup oil, 35 cost indices, 13,800 feet cruising altitude, 5 takeoff flap, and 20% center of gravity.

Since the air route is short and mainly consists of arrival-departure sites, it is particularly suitable to test the effect of the optimization solution. In the absence of the optimization solution, the computation for speed and altitude of all waypoints takes 3 minutes and 30 seconds. With the solution, however, the time involved is shorten to 35 seconds.

Based on FIG. 2-6, one example of the present invention provides a FMS and CDU training aid, comprising a shell, a circuit portion and a CDU interface, wherein the circuit portion is installed within the shell and the CDU interface is connected to the circuit portion, wherein the circuit portion comprises a computing element and a storage cell.

According to an example of the present invention, the FMS and CDU training aid comprises a hardware of CDU interface, a computing element specifically used to compute horizontal sections and vertical sections and a storage cell for storing a navigation database, a performance database, horizontal sections and vertical sections. According to another example of the present invention, the FMS and CDU training aid is a tablet PC similar with iPad or other mobile devices, wherein the CDU interface is a touch screen of the tablet PC.

The above examples are only used to describe, rather than limit, the present invention. A person skilled in the art can make various changes to and modify the forms of the present invention without departing from the scope thereof. In other words, all equivalent technical solutions fall under the present invention.

We claim:

1. A simulation device of flight management system (FMS), comprising:
   a navigable database and a performance database;
   a horizontal section portion;
   a vertical section portion, and
   a display portion comprising an interface of control display unit (CDU), mutually integrated with the horizontal section portion and vertical section portion, wherein
   the horizontal section portion is configured to determine horizontal route information designated by a user through the navigable database and the performance database, and
   the vertical section portion is configured to determine vertical route information of the route designated by a user through the navigable database and the performance database, wherein
   the vertical section portion is further configured to determine the vertical route information by:
      calculating a predicted speed and a predicted altitude for each waypoint of a flight according to limits for speed and altitude of each waypoint, and
      obtaining at least a distance between two waypoints of the flight by determining the vertical route information of a plurality of points in the flight based on the predicated speed and the predicated altitude for each waypoint, the plurality of points comprising the waypoints,
   wherein the horizontal section portion is further configured to update the horizontal route information according to the obtained distance; and
   the updated horizontal route information and the determined vertical route information are displayed on the interface of CDU.

2. The simulation device of FMS according to claim 1, wherein the display portion comprises:
one or more display pages;
a page database comprising one or more data items with each display page number having a corresponding data item, and
a transferring instrument for transferring one or more data items in the page database to the one or more corresponding display pages.

3. The simulation device of FMS according to claim 2, each page comprises a plurality of variable areas for displaying contents, and the corresponding data items in the page database comprise a plurality of contents, wherein at least one variable area can be updated according to the contents of the corresponding data item in the page database.

4. The simulation device of FMS according to claim 3, the transferring instrument comprises at least one sub-transferring instrument which performs real-time computing and updates at least one variable area.

5. The simulation device of FMS according to claim 1, the horizontal section portion comprises a leglistVertical for computing a vertical section, wherein each route comprises horizontal waypoint information of one or more waypoints.

6. The simulation device of FMS according to claim 5, the horizontal section portion further comprises a leglistTemp for storing modifications, a leglistFinal for storing executed routes and a leglistFull for storing waypoints throughout a flight.

7. The simulation device of FMS according to claim 1, the vertical section portion comprises take-off sub-portion, climbing sub-portion, cruising sub-portion, declining sub-portion, landing sub-portion and going around sub-portion, wherein each sub-portion comprises one or more predetermined points and the vertical section portion computes vertical section information of each the predetermined point.

8. The simulation device of FMS according to claim 7, one predetermined point is set by every other one second for the take-off and approaching portions.

9. The simulation device of FMS according to claim 7, the vertical section portion computes the vertical section information of the predetermined points, by iteration, of take-off sub-portion, climbing sub-portion, cruising sub-portion, declining sub-portion, landing sub-portion and going around sub-portion.

10. The simulation device of FMS according to claim 9, the vertical section portion simplifies, by table looking up, the iteration calculation of predetermined points of climbing sub-portion, cruising sub-portion, and declining sub-portion.

11. The simulation device of FMS according to claim 7, the vertical section portion computes, by interpolation, the vertical section information of predetermined points of take-off and approaching sub-portions.

12. The simulation device of FMS according to claim 11, the vertical section portion comprises an arrival-departure database.

13. The simulation device of FMS according to claim 12, the arrival-departure database comprises a plurality of data tables classified by arrival-departure conditions.

14. The simulation device of FMS according to claim 13, the arrival-departure database comprises a plurality of sub-data tables classified by initial performance parameters of an airplane.

15. The simulation device of FMS according to claim 14, the sub-data tables comprise a plurality of vertical section data with each vertical section data corresponding to the specific values of initial performance parameters of one or more airplanes.

16. The simulation device of FMS according to claim 15, the specific values of initial performance parameters of one or more airplanes comprise a maximum value and a minimum value.

17. The simulation device of FMS according to claim 1, wherein the vertical section portion upgrades horizontal route information of the horizontal section portion according to vertical route information.

18. The simulation device of FMS according to claim 1, wherein the vertical section portion uses the vertical sections that have at least partially been computed when waypoints change.

19. A training aid comprising the simulation device of FMS according to claim 1.

* * * * *